June 9, 1942.   R. W. DE MONTE   2,285,912
ELECTRIC UNBALANCE INDICATOR
Filed Nov. 7, 1940

INVENTOR
R. W. DE MONTE
BY
G. H. Heydt
ATTORNEY

Patented June 9, 1942

2,285,912

UNITED STATES PATENT OFFICE 2,285,912

ELECTRIC UNBALANCE INDICATOR

Robert W. De Monte, Glen Ridge, N. J., assignor to Bell Telephone Laboratories, Incorporated, New York, N. Y., a corporation of New York Application November 7, 1940, Serial No. 364,643

5 Claims. (Cl. 177—311)

This invention relates to indicators and more particularly to an electric indicator adapted to indicate the existence of unbalance in normally balanced electrical systems carrying alternating current components.

In balanced electrical systems where successful operation is dependent upon the maintenance of balance, it is very helpful to have some automatic means for indicating the existence of unbalance.

It is therefore the object of this invention to provide a means for indicating the existence of unbalance in normally balanced electrical systems.

The foregoing object is attained by this invention which provides in a balanced electrical system carrying alternating current components, a transformer with a plurality of primaries and a secondary winding, the primaries being individually inserted in the several current paths of the balanced system, whereby voltages of harmonic frequencies are generated in the secondary having magnitudes dependent upon the condition of balance and a frequency selective indicating means adapted to indicate a change in magnitude of one of these harmonic voltages.

Figure 1:
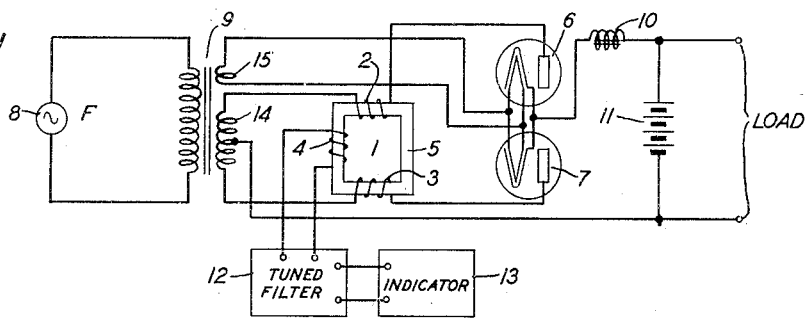

The invention may be better understood by referring to the accompanying drawing in which Fig. 1 discloses a circuit diagram embodying the features of this invention as applied to a balanced rectifier system.

Figure 2:
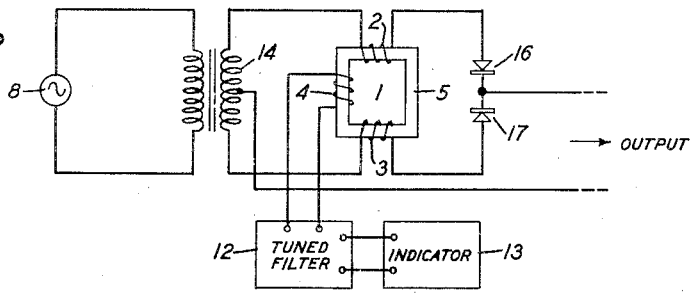

Fig. 2 discloses the invention applied to a balanced copper-oxide rectifier system.

Figure 3:
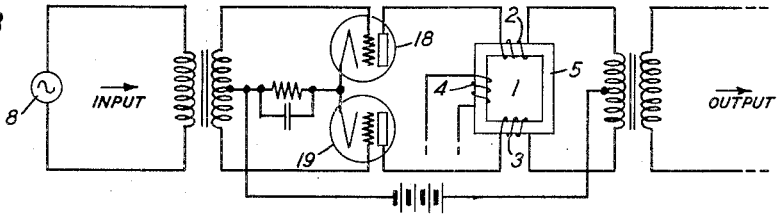

Fig. 3 discloses the invention applied to a balanced amplifier system commonly called a push-pull amplifier.

Figure 4:
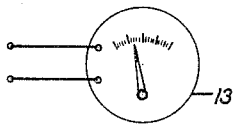
Figure 5:
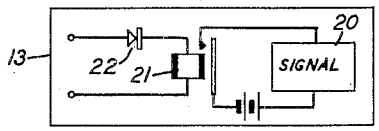

Fig. 4 shows one form of quantitative unbalance indicator which may be an alternating current meter or rectifier type direct current meter, and Fig. 5 is another type of indicator for giving an audible or visible signal.

Referring now to Fig. 1 wherein the invention is applied to a balanced vacuum tube rectifier circuit. Reference numeral 1 denotes a three winding transformer having primaries 2 and 3 and a secondary winding 4 wound on core 5. While for the sake of clarity this transformer has been disclosed herein as of the core type, it will be obvious to those skilled in the art that other types of transformers may be used to equal advantage without departing from this invention. Primary windings 2 and 3 are connected in the space current paths of rectifier tubes 6 and 7, respectively, and may be connected so that their pulsating magnetomotive forces are either series aiding or in series opposition. For economy and for the sake of compactness it is preferable that they be connected in series opposition. Secondary winding 4 will have voltages of harmonic frequencies generated therein proportional to the resultant magnetic flux in core 5 and may be utilized as hereinafter more fully explained to indicate the condition of balance of the system.

Power is supplied from alternating current source 8 of frequency F which for most commercial power sources is standardized at 60 cycles per second. Transformer 9 transmits this power to rectifiers 6 and 7 through center tap transformer secondary 14 and finally to the battery 11 and the load through choke 10. The cathodes of tubes 6 and 7 are heated from secondary winding 15 of transformer 9. This circuit is of a conventional type and further description thereof is believed wholly unnecessary.

The voltages induced in secondary winding 4 will be as indicated in the table below:

| Condition of balance | Voltages induced in secondary | |
|---|---|---|
|  | Primaries opposing | Primaries aiding |
| Balanced | X at frequency = F <br> O at frequency = 2F | O at frequency = F. <br> Y at frequency = 2F. |
| Partial unbalance | uX at frequency = F <br> vY at frequency = 2F | mX at frequency = F. <br> nY at frequency = 2F. |
| Total failure of one side. | X/2 at frequency = F <br> Y/2 at frequency = 2F | X/2 at frequency = F. <br> Y/2 at frequency = 2F. |

In the above table voltage X may be defined as a voltage at fundamental frequency induced in winding 4 when the system is perfectly balanced and the primaries are connected in opposition. Voltage Y may be defined as the voltage of second harmonic frequency induced in winding 4 when the primaries are connected aiding in a perfectly balanced system. Factors $u$, $v$, $m$ and $n$ are proper fractions the magnitudes whereof are dependent upon the degrees of unbalance. Only the fundamental and second harmonics are considered in the above table. It is well known, however, that other harmonics are also present and may be utilized in the practice of this invention if desired. Although the invention is described with particular reference to the fundamental and second harmonic voltages generated in secondary 4, it will be understood that the description applies equally to the other harmonic voltages.

It was previously stated that primaries 2 and 3 may be connected either in opposition or in series aiding. Assume, for example, that they are connected in series opposition. In such a case the above table indicates that for the balanced condition, the fundamental frequency voltage induced in secondary 4 will be equal to X while there will be no second harmonic voltage induced. Should, however, the cathode emission of either tube 6 or 7 fall off so as to produce a partial condition of unbalance, the fundamental frequency voltage induced in winding 4 will be reduced by a factor $u$ as indicated in the above table, while some second harmonic voltage will appear equal to $vY$. Furthermore upon complete failure of either rectifier 6 or 7, the fundamental and second harmonic frequency voltages will be X/2 and Y/2, respectively as indicated in the above table.

Voltage conditions similar to those described above apply when the primaries are connected in series aiding except that in this case the fundamental frequency voltage is 0 while the second harmonic frequency voltage is equal to Y for the balanced condition.

A suitable filter 12 tuned to one of the harmonic voltages generated in secondary 4 is adapted to select this harmonic so that the magnitude of its voltage may operate an indicator 13 whereby the condition of balance may be ascertained. A great variety of band-pass and band-elimination filters suitable for use in this invention are well-known in the art and detailed descriptions of any one of them is believed unnecessary.

The structure disclosed in Fig. 2 is essentially the same as that shown in Fig. 1 with the exception that the rectifiers are of the dry type such as copper oxide rectifiers instead of the thermionic type shown in Fig. 1. The description relating to Fig. 1 is otherwise applicable to Fig. 2.

In Fig. 3 the invention is applied to the balanced type amplifier commonly referred to as a push-pull amplifier. The filter and indicator circuits have been deleted for the sake of clarity but are connected as shown in Fig. 1, the reference numerals relating to the transformer remaining the same as for Figs. 1 and 2. It will be noted that the primaries 2 and 3 are connected in the current paths of the tubes 18, 19 in the two branches of the balanced system and that these are essentially the same connections as those used for the rectifier systems shown in Figs. 1 and 2.

The meter shown in Fig. 4 may be used as quantitative indicator of unbalance in any one of the systems above described. An alternating current meter or a rectifier type direct current meter adapted for measuring alternating current voltages may be used and the meter calibrated directly in percentage unbalance. It is obvious that this meter may be made to indicate the magnitude of unbalance irrespective of which harmonic is selected.

Fig. 5 discloses an indicator means 13 comprising visible or audible signal 20, relay 21 and rectifier 22. Its connection to Figs. 1, 2 or 3 is obvious from inspection. A signal will be given by this device upon reaching a predetermined condition of unbalance or upon total failure of one side of the balanced system. If the filter is, for example, designed to pass the second harmonic only and the primary windings 2, 3 are connected series-opposing, this relay would be of the normally open contact type as its symbol indicates. On the other hand if the filter is tuned to pass only the fundamental, then the contacts should be normally closed because its coil is energized to open them when the system is balanced. Applying similar considerations when the primaries 2, 3 are connected series-aiding it is seen that the normally open relay should be used when the filter passes only the fundamental and the normally closed contact relay when the filter passes only the second harmonic.

Wherever the term "indicating" is used in the appended claims, it should be understood as including audible and visible indicators as well as quantitative indicators such as meters.

What is claimed is:

1. An indicator for a two-branch balanced electrical system carrying alternating current components for indicating unbalance in the system comprising two current paths one for each branch of the balanced system, a transformer, two separate primary windings wound thereon one for each current path, means connecting said primaries into their respective current paths, a secondary winding on the transformer inductively related to both primaries whereby said secondary will have generated therein a voltage having a frequency which is a harmonic of an alternating current component carried by the system, a frequency selective network connected to said secondary and tuned to said harmonic, and an indicating means connected to the selective network responsive to a change in voltage of said harmonic.

2. An indicator for a two-branch balanced electrical system carrying alternating current components for indicating unbalance in the system comprising two current paths connected in balanced relation, a three-winding transformer two windings whereof are connected severally in the current paths of the balanced system whereby the third winding will have generated thereacross a voltage having a frequency which is a harmonic of an alternating current component carried by said system, a frequency selective network tuned to said harmonic voltage, an indicating means responsive to any change in said harmonic voltage caused by unbalance in the system, and means connecting the network between said third winding and the indicating means.

3. An alarm circuit for a two-branch balanced vacuum tube system carrying alternating current components for signaling the failure of one of the tubes comprising two vacuum tubes connected in balanced relation, a space current path for each tube, a three-winding transformer two windings thereof are connected severally in the space current paths of the two tubes whereby the third winding will have generated thereacross a voltage having a frequency which is a harmonic of an alternating current component carried by said tube, a frequency selective network tuned to said harmonic voltage, a signaling means responsive to any change in said harmonic voltage caused by the failure of one of the tubes, and means connecting the network between said third winding and the signaling means.

4. An unbalanced indicator for a two-branch balanced vacuum tube system carrying alternating current components comprising two vacuum tubes connected in balanced relation, a space current path for each tube, a three-winding transformer two windings whereof are connected severally in the space current paths of the two tubes whereby the third winding will have generated thereacross a voltage having a frequency which is a harmonic of an alternating current component carried by said tubes, a frequency selective network tuned to said harmonic voltage, a measuring means adapted to indicate the magnitude of any change in said harmonic voltage caused by the failure of one of the tubes, and means connecting the network between said third winding and the measuring means.

5. An alarm circuit for a two-branch balanced vacuum tube system carrying alternating current components for signaling the failure of one of the tubes comprising two vacuum tubes connected in balanced relation, a space current path for each tube, a circuit portion common to both space current paths, impedance means included in said common portion so as to have generated thereacross a voltage having a frequency which is a harmonic of an alternating current component carried by said tube, a frequency selective network tuned to said harmonic voltage, a signaling means responsive to any change in said harmonic voltage caused by the failure of one of the tubes and means connecting the network between the impedance means and the signaling means.

ROBERT W. DE MONTE.